United States Patent [19]

Baumgarten

[11] Patent Number: 5,203,465

[45] Date of Patent: Apr. 20, 1993

[54] LID WITH A VALVE-CONTAINING KNOB FOR A COOKING UTENSIL

[75] Inventor: Gerd D. Baumgarten, Wilnsdorf-Wilden, Fed. Rep. of Germany

[73] Assignee: Heinrich Baumgarten KG Spezialfabrik fuer Beschlagteile, Neunkirchen, Fed. Rep. of Germany

[21] Appl. No.: 835,621

[22] Filed: Feb. 13, 1992

[30] Foreign Application Priority Data

Feb. 14, 1991 [DE] Fed. Rep. of Germany ....... 9101708

[51] Int. Cl.$^5$ ............................................. B65D 51/16
[52] U.S. Cl. .................................... 220/206; 220/231; 220/367
[58] Field of Search ............... 220/202, 203, 206, 208, 220/231, 367, 368, 369, 371, 373; 215/307, 311

[56] References Cited

U.S. PATENT DOCUMENTS

| | | | |
|---|---|---|---|
| 2,463,516 | 3/1949 | Buckhardt | 220/203 X |
| 2,592,992 | 4/1952 | Abercrombie | 220/206 X |
| 3,395,695 | 8/1968 | Nagashima et al. | 220/206 X |
| 3,827,596 | 8/1974 | Powers, Jr. | 220/367 X |
| 4,461,452 | 7/1984 | Kregza | 220/206 X |
| 4,548,156 | 10/1985 | Shibata | |
| 4,557,396 | 12/1985 | Baumgarten | 220/206 |

FOREIGN PATENT DOCUMENTS

| | | |
|---|---|---|
| 0111292 | 6/1984 | European Pat. Off. |
| 0131459 | 1/1985 | European Pat. Off. |
| 2822490 | 6/1979 | Fed. Rep. of Germany |
| 8512063 | 7/1985 | Fed. Rep. of Germany |
| 262260 | 12/1926 | United Kingdom |

Primary Examiner—Allan N. Shoap
Assistant Examiner—Nova Stucker
Attorney, Agent, or Firm—Flynn, Thiel, Boutell & Tanis

[57] ABSTRACT

A lid for a cooking utensil comprising a valve-containing knob 2 rotatably supported on the lid 1. The lid 1 has a hole 3 therethrough. The valve-containing knob 2 has a venting outlet 4 which can be selectively aligned with the hole 3 in the lid 1. In order to be able to guarantee a vented position, a whistle position and also a closed position being attained utilizing a simple and reliable design of the valve-containing knob, the invention provides that the valve-containing knob 2 is supported on a central support element fastened on the lid 1 and is initially tensioned against the lid 1 by means of a initial tensioning element 5, and that the valve-containing knob 2 has a whistle opening 6 adapted to be arranged in alignment with the hole 3 in the lid 1.

2 Claims, 1 Drawing Sheet

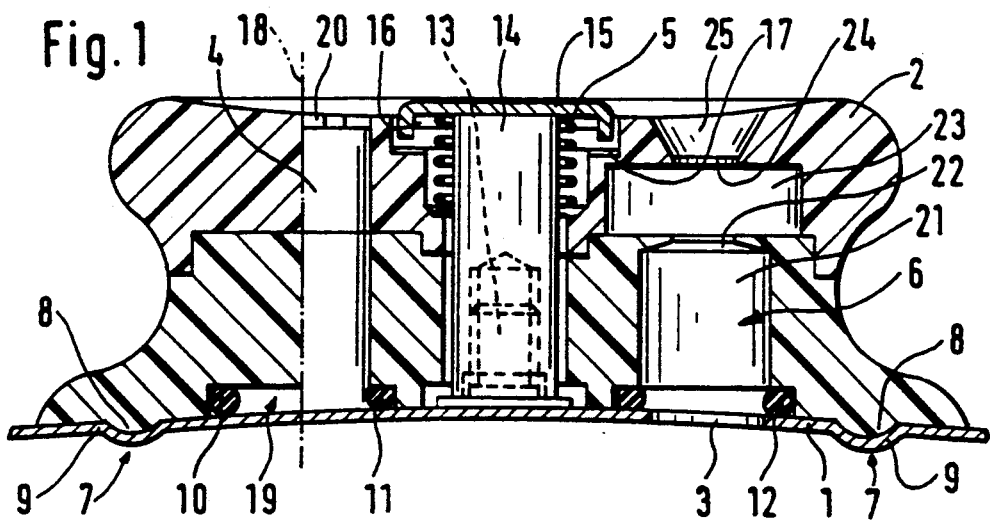
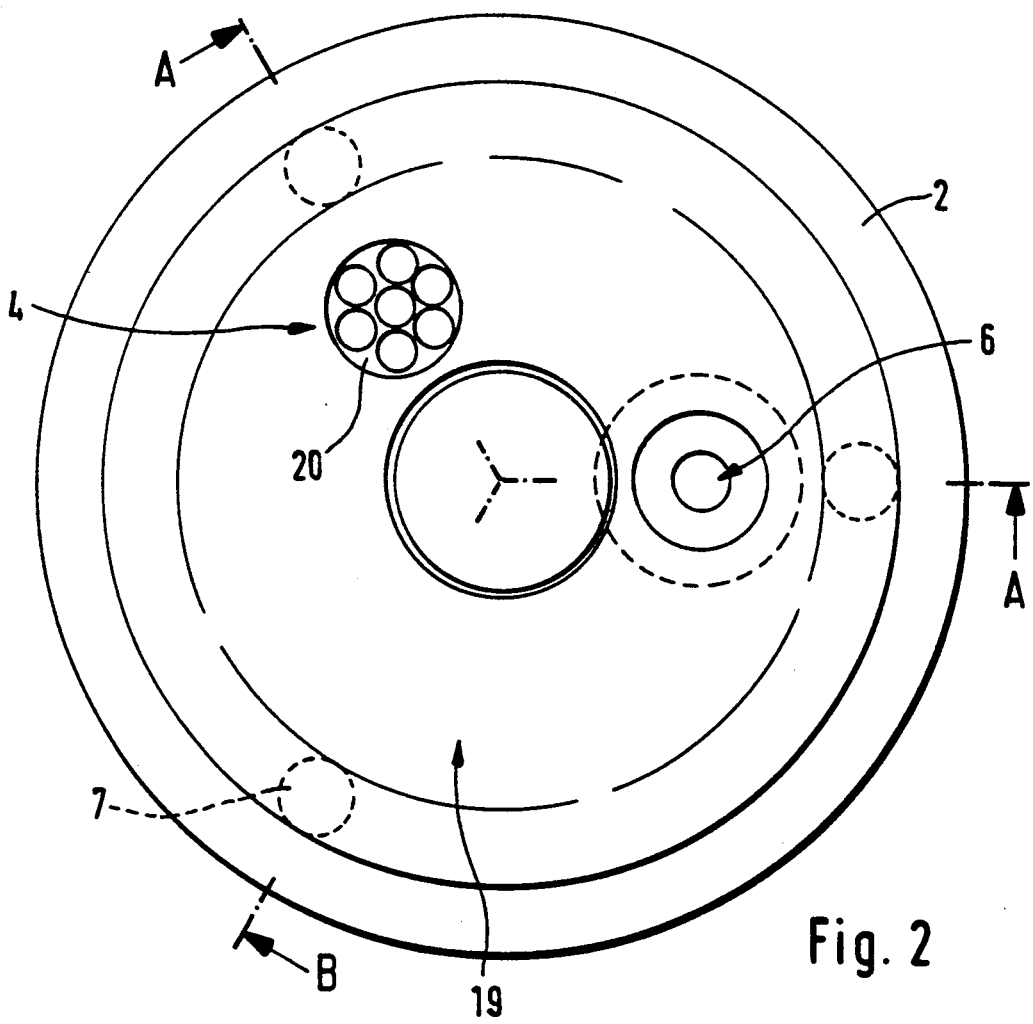

5,203,465

LID WITH A VALVE-CONTAINING KNOB FOR A COOKING UTENSIL

FIELD OF THE INVENTION

The invention relates to a lid for a cooking utensil, comprising a valve-containing knob rotatably supported on the lid and having at least one hole therethrough and a venting opening selectively connectable to the hole in the lid.

BACKGROUND OF THE INVENTION

For lids of cooking utensils, for example cooking pots, frying pans or others, there exists the necessity to tightly close off, in dependency of the cooking procedure, the inside of the cooking utensil against the surroundings by means of the lid or to bring this inside in contact with the surroundings. This depends on the respective cooking procedure. It can thereby be desirous to change easily and quickly between a closed position and a vented position.

It may also be desirous under certain procedural conditions to install a whistle on the lid of the cooking utensil in order to acoustically indicate a cooking or simmering of the content of the cooking utensil. A valve-containing knob suited for this is known from DE-AS 28 22 490. A manually movable slide member exists in this valve-containing knob which makes it possible to activate or deactivate the whistle. A large-volume venting of the inside of the cooking utensil without the sound of the whistle is not possible.

SUMMARY OF THE INVENTION

The basic purpose of the invention is to provide a lid of the above-mentioned type which, with a simple and reliable handling design, facilitates a closed position, a vented position and a whistle position.

The purpose is attained according to the invention by the valve-containing knob being supported on a central support element fastened on the lid and being initially tensioned against the lid by means of an initial tensioning element, and by the valve-containing knob being provided with a whistle opening adapted to be selectively arranged in alignment with a hole through the lid.

The lid of the invention is distinguished by a number of significant advantages. Since the valve-containing knob of the invention is supported rotatably on the lid, it is possible in the simplest manner to select the respective operating position, namely, a closed position, a whistle position and a venting position. By turning the knob injuries to the operator are avoided even when the cooking utensil is hot since the operator does not come into direct contact with parts directly exposed to the steam or gas flow. Furthermore, the initial tension force urging the valve-containing knob in direction of the lid guarantees an exact fit preventing an unintentional exiting of the steam in the separating plane between the valve-containing knob and the lid.

A particularly advantageous development of the invention provides that the valve-containing knob and the lid each have releasable locking elements fixing the valve-containing knob in the venting position, a whistle position or a closed position. The locking elements assure that the valve-containing knob is in one of the three desired positions so that an incorrect operation is not possible. This significantly increases the operating safety since unintended operating positions can be avoided and a clear association of the valve-containing knob is always guaranteed.

The locking elements are preferably designed as an elevation on the underside of the valve-containing knob, which elevation faces the lid, and a conforming indentation on the lid. This design has the advantage that the valve-containing knob is fixed against the lid and rests fixedly against the lid in each of the desired operating positions since the knob is initially urged toward the lid by the initial tensioning element. When the operating position is to be changed, the knob must, either by a direct manual lifting by hand or by a simultaneous lifting and turning (twisting) movement, be released from the lid in order to disengage the locking elements. A lifting of the valve-containing knob makes it possible to turn the valve-containing knob without damaging the seals or sealing surfaces existing on the valve-containing knob. The described design of the locking elements is thereby particularly advantageous since, during a turning of the valve-containing knob, the elevation is automatically moved out of the indentation in the lid and the valve-containing knob thus slides on the elevations.

The valve-containing knob has preferably a seal in the area of the venting opening, the whistle opening and the closed area. With the help of the seals, steam or gases cannot exit from the separating area between the valve-containing knob and the lid. Also, the seal in the area of the venting opening is not actually needed, this is only being advantageous with respect to the symmetry of the valve-containing knob.

The support element includes preferably an upstanding cylindrical sleeve fastened at its lower end to an upstanding threaded bolt fastened on the lid, and a holding plate connected to the upper end of the sleeve. This type of fastening has the advantage that no visible fastening parts accessible to the user exist, which at all times provoke a detachment of the valve-containing knob for the purpose of cleaning. The holding plate fastened to the upper end of the sleeve is used as an abutment for the initial tensioning element and forms a visible, center area of the valve-containing knob. The holding plate can advantageously have at least one pawl facing the valve-containing knob, which pawl can during a lifting of the valve-containing knob engage at least one locking recess on the valve-containing knob. The valve-containing knob can thus be mounted by screwing same in a lifted state pressed against the action of the initial tensioning element, in which state the sleeve is connected fixed against rotation to the valve-containing knob, onto the threaded bolt on the lid. A detachment of the knob is done in an analogous reverse manner.

The locking recess and the pawl have in an advantageous manner a spacing therebetween which is larger than the dimension at which the valve-containing knob is lifted during a change of the knob elevation caused by the locking elements.

The valve-containing knob can be manufactured of a plastic material. It is also possible to manufacture it of a metal.

BRIEF DESCRIPTION OF THE DRAWINGS

The invention will be described hereinafter in connection with one exemplary embodiment and the drawings, in which:

FIG. 1 is a cross-sectional view of a valve-containing knob embodying the invention taken along two different lines, namely, A—A and A—B of FIG. 2; and FIG. 2 is a top view of the valve-containing knob shown in FIG. 1.

DETAILED DESCRIPTION

The top view of the valved knob shown in FIG. 2 shows various cross-sectional lines for the combination illustration in FIG. 1. The right half of FIG. 1 corresponds with the cross-sectional view A—A, this cross-sectional view continues to the line 18 drawn in FIG. 1. To the left of this line is illustrated in FIG. 1 the corresponding part of the cross section A—B according to FIG. 2.

FIG. 1 is a partial cross-sectional view of a common lid 1 of a cooking utensil. An upstanding cylindrical sleeve 14 having an internally threaded opening at its lower end is fastened to the lid at its lower end by means of a threaded bolt 13 screwed into the internal thread on the cylindrical sleeve 14. The cylindrical sleeve 14 carries a holding plate 15 at its upper end to form an abutment against which an initial tensioning element 5 (spring) is supported. A valve-containing knob 2 is oriented between the abutment and the lid. The initial tensioning element 5, in turn, is oriented between the abutment 15 and the knob 2 to urge the knob against the upper side of the lid 1. The valve-containing knob 2 has a central recess in which is received the cylindrical sleeve 14, so that the valve-containing knob 2 can be freely rotated relative to the lid 1 about the axis of the sleeve 14.

The radially outer edge of the holding plate or abutment 15 has, in the exemplary embodiment, several pawls 16 facing inwardly toward the lid 1. The pawls 16 are adapted to be received in locking recesses 17 on an upwardly facing side of the valve-containing knob 2 only when the valve-containing knob 2 is manually lifted a sufficient distance away from the lid 1 against the initial tensioning force of the spring 5. Otherwise, the spring 5 keeps the knob 2 in an engaging relation with the lid 1.

As shown in FIG. 2, the valve-containing knob 2 has altogether three different operating areas, namely a venting outlet area 4, a whistle opening area 6 and a closed area 19 symmetrically arranged thereon. The lid 1 has an opening or hole 3 (FIG. 1) therethrough which can be selectively brought into association and alignment with one of the three above-described operating areas by turning the valve-containing knob 2 about the axis of the sleeve 14.

The venting outlet area 4 includes a uniform cross section and is covered at its upper end by a screen 20. The whistle opening area 6 has a conventional design and includes a cylindrical chamber 21 transferring into a further chamber 23 through a nozzle opening 22. A further nozzle opening 24 exists at the other end of the chamber 23, which further nozzle 24 opens outwardly of the knob in an outlet funnel 25. The whistle opening 6 is thus designed in the usual manner and as is known from the state of the art.

The closed area 19 is designed as an opening or blind hole as illustrated on the left half of FIG. 1. In order to guarantee a secure seal of the individual operating areas relative to the hole 3 in the lid 1, O-rings 10, 11 and 12 are each provided. They are not needed when the valve-containing knob is fitted exactly to the shape of the lid. Furthermore, the O-ring 10 for the closed area 19 is not needed.

In order to guarantee a fixing of the valve-containing knob 2 in the respective operating position, several locking elements 7 are provided and each thereof are similar in design to a spherical-like elevation 8 provided on the underside of the valve-containing knob 2 and a matching or conforming indentation 9 provided in the lid 1. Upon a rotation of the valve-containing knob 2, the knob is lifted away from the lid by the elevations 8 sliding up out of the indentations to slide along an otherwise flat and unobstructed part of the lid 1, so that the compressive forces on the seals 10-12 are relieved during rotation of the valve-containing knob 2 and are thus protected from damage.

The invention is not to be limited to the illustrated exemplary embodiment because many modification possibilities which lie within the scope of the invention will be evident to the man skilled in the art.

The embodiments of the invention in which an exclusive property or privilege is claimed are defined as follows:

1. A lid for a cooking utensil, comprising: a valve-containing knob rotatably supported on the lid, said lid having a hole therein, and said valve-containing knob being provided with a venting opening selectively connectable to said hole in said lid, said valve-containing knob being supported on a central support element fastened to said lid and initially urged toward and against said lid by means of an initial tensioning element, said valve-containing knob having a whistle opening adapted to be selectively arranged in alignment with said hole in said lid, wherein said support element includes a cylindrical sleeve secured to said lid by a threaded bolt which is fastened on said lid on the same side of said lid on which said knob is located, and a holding plate connected to said sleeve, wherein said valve-containing knob and said lid each have releasable locking elements for fixing said valve-containing knob in one of a venting position, a whistle position and a closed position, wherein said locking elements include at least one raised elevation on an underside of said valve-containing knob facing said lid, and a conforming indentation in said lid therefor, wherein said holding plate has at least one pawl facing said valve-containing knob, wherein said valve-containing knob has at least one locking recess into which is selectively received said locking pawl upon a lifting of said valve-containing knob, and wherein said locking recess and said locking pawl are spaced apart a distance greater than a distance that said valve-containing knob is lifted away from said lid when said locking elements are released from one another in response to said valve-containing knob and said lid being rotated with respect to one another.

2. The lid according to claim 1, wherein said venting position, said whistle position and said closed position each include means defining an opening in said valve-containing knob, and wherein said valve-containing knob has seals about each of said openings.

* * * * *